United States Patent [19]

Gupta

[11] 4,455,012

[45] Jun. 19, 1984

[54] REMOTELY CONTROLLED VALVE

[75] Inventor: Krishna M. Gupta, Ithaca, N.Y.

[73] Assignee: Porous Materials, Inc., Ithaca, N.Y.

[21] Appl. No.: 341,707

[22] Filed: Jan. 22, 1982

[51] Int. Cl.³ .................. F16K 31/04; G05D 3/08
[52] U.S. Cl. ............................ 251/134; 318/469;
318/474; 318/484
[58] Field of Search ............ 251/136, 134; 318/474, 318/469, 484

[56] References Cited

U.S. PATENT DOCUMENTS 3,891,909 6/1975 Newson ........................ 318/469
4,099,704 7/1978 Okumura et al. ............ 251/134

FOREIGN PATENT DOCUMENTS 10391 4/1980 European Pat. Off. ........... 251/134

Primary Examiner—A. Rosenthal
Attorney, Agent, or Firm—Michael F. Brown; Ralph R. Barnard

[57] ABSTRACT

A remotely contollable, motorized valve suitable for microprocessor control. The valve is protected against over-closure by a technique of current sensing of motor current. Starting surges are ignored through the use of a timing circuit. The valve may be re-started in the event of mid-travel stoppage, but is still protected against damage due to such stoppage, by permitting manual reset after the valve is stopped.

4 Claims, 2 Drawing Figures

REMOTELY CONTROLLED VALVE

BACKGROUND OF THE INVENTION

The invention pertains to valves which can be controlled from an operator position remote from the valve position. More specifically, the invention pertains to motorized valves of the type having provision for automatically stopping the motor at the end of valve travel.

Many applications require the use of remotely-controlled valves to meter fluids. With the increasing application of microprocessors to all areas of technology, many industries have come to require valves which are adaptable for use with microprocessor control. The size reduction made possible by the microprocessor has also demanded valves which are as small as possible.

It is an object of this invention to provide a valve which is remotely controllable.

It is a further object of the invention to provide a remotely-controlled valve which is particularly suited to control by electronic devices, such as microprocessors.

It is a still further object of the invention to provide a valve which is as compact as possible, while still being able to control high pressures in the range of 5,000 to 100,000 PSI, or more.

Motorized valves are not new. Large electrically-controlled valves were used in steam, water, and gas systems may years ago. Valves of the size used in generating plants or water systems tended to be of the "sluice-gate" type, wherein a plate was lowered into a pipe, blocking the flow of water. Such valves are quite rugged, and the forces used are great, so that a valve may be driven shut without danger of damage. Limit switches at the ends of the valve travel sufficed to shut off the motors, if any automatic shut-off was provided at all. Some devices were equipped with slip-clutches, or overriding clutches, which would allow the motor to turn past the point where the valve had been fully closed or opened. See, for example, Andersen, U.S. Pat. No. 865,556 [1907], or Buescher, U.S. Pat. No. 2,671,331 [1956].

Even in very large valves, however, the use of excessive amounts of torque to "slam" a valve shut, or to continue tightening the valve past the end of its travel, will lead to unnecessary wear. To minimize this, some valve designs included mechanical torque sensing mechanisms, such as spring-loaded cams, to shut off the motor when a torque limit on the shaft was exceeded (Fortner, U.S. Pat. No. 3,675,751 [1972], and Balz, U.S. Pat. No. 3,700,085 [1972]). In valves of the type represented by this invention, however, such mechanical torque sensing devices are not practical due to their size, complexity, and inaccuracy. The small seats used in high-pressure valves could be damaged before a mechanical torque-sensor could respond. Also, mechanical torque-sensors are hard or impossible to adjust to the differing torques required by different pressures being metered, or due to wear or friction in the valve mechanism. This is very critical in smaller valves, especially those for high pressures, where such effects are magnified.

It thus an object of the invention to provide a controller for a small valve especially useful at high pressures which can be operated with minimal wear and tear on the valve due to overtorquing; and which is adjustable to a wide range of valve conditions.

One effective method of determining that the valve has reached the end of its travel is to measure the current supplied to the motor. As the motor is "stalled," the current drawn increases dramatically. This was recognized in a 1909 patent to Kanmacher, U.S. Pat. No. 923,186 which used the overcurrent to draw in a solenoid, unlatching a mechanical switch and stopping the valve motor. Chitty, U.S. Pat. No. 1,734,419 [1929] also looked at current, without providing for automatic shut-off.

The method of determining valve closure by current is, in fact, the most practical method available for use in automatic valve control. When attempting to use the technique in a smaller type valve, however, several problems arise. Driving the motor fully into a "stalled" condition could damage the valve. Also, the current sensing can be "fooled" by the starting surge current of the motor or by increased friction in mid-travel.

Okamura, et al. U.S. Pat. No. 4,099,704 [1978] solve the latter problem by sensing valve position by means of photocells and holes in the valve shaft. The current sensing is only in effect when the valve is "almost" closed. This requires a specially modified valve, adding complication. The current sensing will stop the motor when the current rises above a given point, but only at the end of travel. This can pose problems, however, if the valve were to stick in an intermediate position. In such a case the motor is liable to burn out, or the valve may be damaged, as the current limit will be ignored. Conversely, if the valve encounters resistance toward the end of its travel, the controller cannot cause the motor to re-try the valve closure.

This can become particularly important if the valve were to stall just before complete closure, due perhaps to dirt in, or damage to, the valve. At very high pressures, there might be unusual resistance to valve closure. The operator might need to force the valve shut to stop the flow in the system. He might well decide to do this, regardless of any possible damage to the valve. The control must allow him this option.

It is an object of the invention to provide a controller for valves using current sensing to limit valve torque.

It is a further object of the invention to provide a current-limit controlled valve which is "resettable" to allow re-trial of valves which might stick or stop due to friction or current surges.

Other objects of the invention will become apparent in the more detailed disclosure below.

SUMMARY OF THE INVENTION

The invention provides a controller for valves of using a motor to drive the valve. The current drawn by the motor is measured, and the motor is shut-off when the current exceeeds a given value. To avoid triggering the current limit by surges during motor start-up, a time delay is provided to disable current sensing for a period following valve activation.

DESCRIPTION OF THE PREFERRED EMBODIMENT

Figure 1:
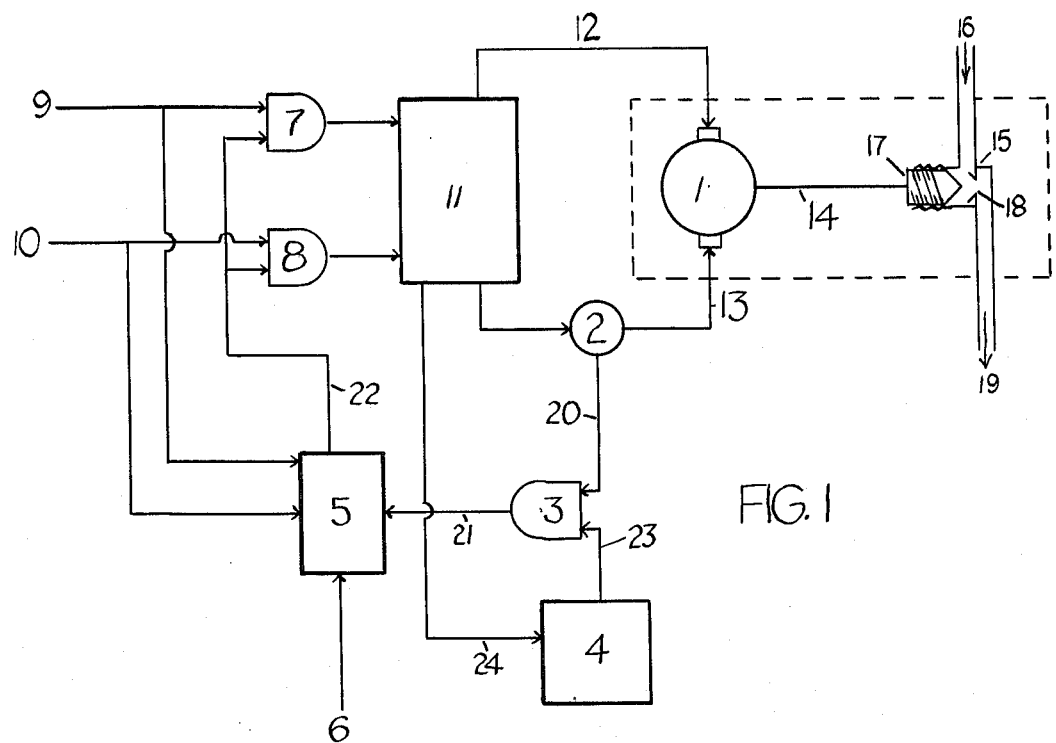
FIG. 1 shows a block diagram of the invention as a whole.

Referring to FIG. 1, it will be seen that the preferred embodiment of the invention is composed of two groups of elements, the valve assembly (enclosed in dotted lines) and the control circuitry. Normally, the valve assembly will be remotely located, perhaps within a complex of other equipment, with the control circuitry at the location of the operator or computer, if the valve is to be computer controlled. The two groups are connected by wires ((12) and (13)).

The valve/motor assembly comprises the motor (1), connected by a shaft and/or gearbox (14) to the valve head (17) inside the valve body (15). The valve head fits into a valve seat (18), controlling gas flow between the inlet (16) and outlet (19) ports of the valve. It should be understood that the valve arrangement illustrated is not critical to the invention, being chosen for simplicity of illustration, and that the valve may be any type of valve having end positions with physical stops, including a valve of the type switching a single inlet to one or two outlets, without departing from the teachings of the invention.

The motor (1) may be any convenient type of motor, preferably one of the smaller direct-current types. A DC motor is preferable, since it is the easiest to control and reverse.

Current is supplied to the motor by the motor controller (11) which supplies DC current (if a DC motor is used) of the correct polarity to effect motor motion in the direction chosen by activation of the close (32) or open (33) control inputs.

The current drawn by the motor is measured by the current sensing circuit (2), which generates a digital signal (20) when the current exceeds a given amount, which is determined by an adjustment in the sensing circuitry. Preferably, a separate adjustment is provided for each direction of motor travel. This permits the controller to be adapted to various sorts of valves, including one and two-way, of various pressures. The current sensing circuit may be any type of comparator, of which there are many known in the art, without departing from the teachings of the invention. For example, an integrated circuit such as the LM3900N could be used. The current limit is set to a value less than the fully "stalled" current draw of the motor, but more than the normal motor current.

As an alternative embodiment, the current-limit circuitry may be designed to react to both an absolute current limit and a rate of change in current. Digital current-limit signal (20) would indicate either the presence of a current at or greater than the fully "stalled" current, or a rapid rise in the current drawn by the motor. This will allow a greater degree of freedom from false indications caused by friction or changes in pressure, which result in slower rates of change than the sharp increase caused by a "stalling" motor.

The digital current-limit signal (20) is input to an and-gate (3), along with the output (23) of the time-delay (4). The time delay (4) is triggered by a signal (24) from the motor controller (11) upon initiation of motor operation in either direction. The time delay (23) is combined with the current limit (20) in the gate (3), producing a signal (21) which indicates a current in excess of the limit has been sensed after the elapse of the delay period. Thus, transient currents during the delay period are ignored. The delay period is chosen to bbe just long enough to allow for motor-starting surges, but not so long as to mask the end of travel. The time delay may be any timer circuit known to the art, either discrete components or a "chip" such as the commonly available NE555.

As an added protection, a second timer may optionally be included within (4) which will prevent re-triggering of the time delay until a time period has elapsed. This will prevent the timer from being "fooled" into a condition wherein the time delay never elapses by a rapid series of pulses, as might be caused by an operator pushing the operate switch repeatedly.

In the preferred embodiment, the "limit current after delay" signal (21) is held by a latch circuit (5) which stores the signal (22), preventing further triggering of the valve. This latch is reset by an input (9) or (10) command ordering motor movement in the opposite direction. Thus, the valve cannot be accidentally overtorqued by repeated control inputs, directing valve movement in the same direction. If such movement is required, as it might be if the valve were to be stopped in mid-travel, or if the valve "hangs up" before closing completely, then a reset input (6) may optionally be provided to allow the operator to override the control.

The output of the latch (22), if used, or the "limit after delay" signal (21), if no latch is used, is combined with the operator input open (9) and close (10) signals via a pair of and-gates ((7), (8)). Thus, the motor controller (11) will only be actuated when the operator instructs it to run and the latch indicates that the valve is not at end-of-travel.

The preferred embodiment of the invention operates as follows:

The operator signals for the valve to close (10). This triggers the motor controller (11) "close" input (33) which starts the motor (1) by supplying a current of the proper polarity through the supply wires (12), (13), and simultaneously starts the time delay timer (4). The current sensor (2) measures the current supplied. The current sensor may be triggered by the surge of current as the motor starts, but this is ignored, since the time delay has not yet elapsed. After a delay, the timer (4) output (23) signals that the timer has finished the time delay period. As the valve head (17) closes against the seat (18), the current drawn by the motor (1) increases. When the current exceeds the limit, the current sensor signals (20). Since the time delay has elapsed, and-gate (3) passes the signal (21) to latch (5). Latch (5) output (22) switches, and causes and-gate (8) to turn off the motor-controller input (33), which in turn removes the current supply to the motor, and the valve is closed.

Figure 2:
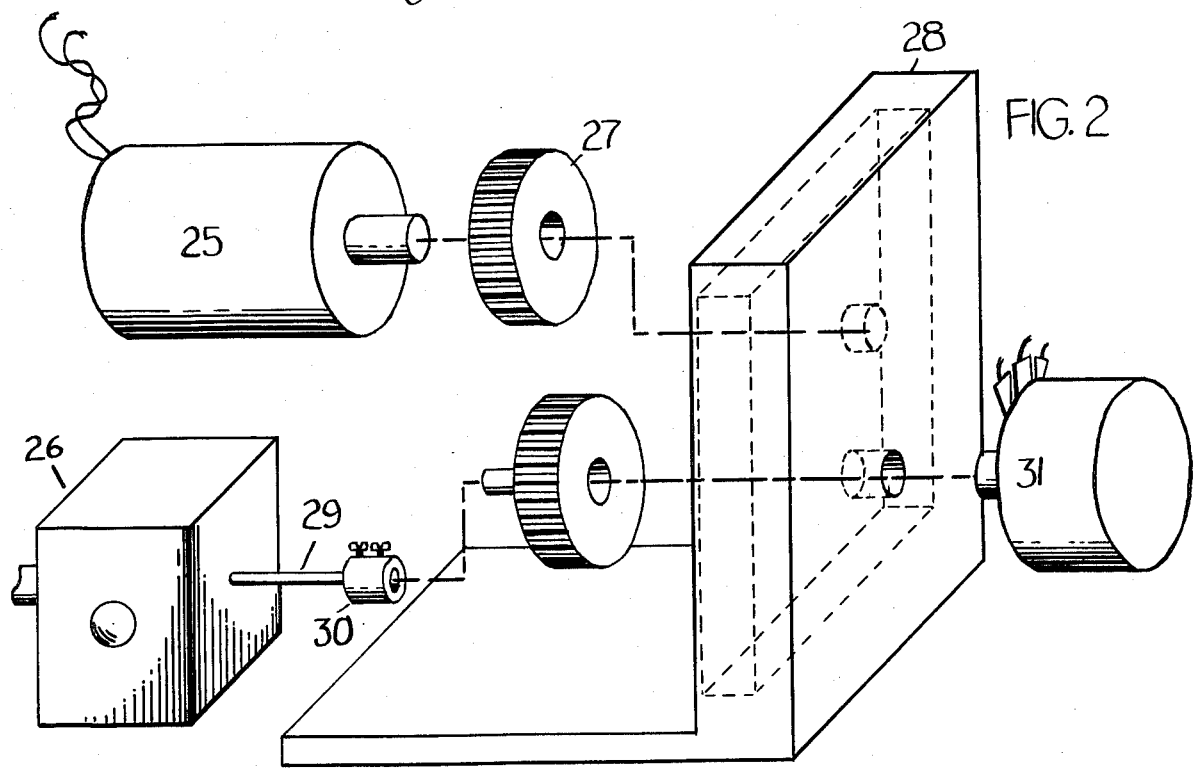
FIG. 2 shows an exploded view of the motor/valve assembly of the preferred embodiment of the valve portion of the invention.

Referring to FIG. 2, the motor/valve assembly of the preferred embodiment of the invention is contructed as compactly as possible. Motor (25) and valve (26) are "folded" over each other by means of a gear train (27) built into the frame (28). The gear train also allows the choice of gear ratios, to adjust for differing conditions of motor torque and speed. The gear train (27) is attached to the valve by means of a shaft (29) and coupling (30). As an option, a potentiometer (31) or digitizer may be ganged to this shaft, to allow feedback as to the absolute position of the valve.

Again, it should be noted that the exact type of valve or motor used is not critical to the invention. Many different physical arrangements are possible without departing from the teachings of the invention.

The preferred embodiment has been shown as a miniature, high-pressure valve, as the advantages of the invention are most marked in such an application. However, the teachings of the invention may be applied to larger valves, or those of lower pressures or vacuum with excellent results.

Accordingly, it is to be understood that the embodiments of the invention herein described are merely illustrative of the application of the principles of the invention. Reference herein to details of the illustrated embodiments are not intended to limit the scope of the claims which themselves recite those features regarded as essential to the invention.

I claim:

1. A motor-controlled valve system comprising:
   a. a valve having two positions, adapted to be mechanically driven between the two positions;
   b. reversible electrical motor means connected to said valve for driving the valve between the two positions wherein the current drawn by the motor increases when a position is reached by the valve;
   c. adjustable current-sensor means for measuring the current in the motor means;
   d. means responsive to said current sensor means for de-energizing the motor means when the current exceeds a preselected value indicating that the valve has been driven to one of its two positions;
   e. adjustable delay means triggered by the energization of the motor means for delaying the de-energization of the motor means, whereby transient currents accompanying the energization of the motor means are ignored;
   f. latch means for preventing energization of the motor means in the same direction as last energized.

2. The motor controlled valve system of claim 1 further comprising means for manually resetting the latch means, whereby the motor means may be energized more than once in the same direction.

3. An improved motorized valve of the type having valve means for controlling the flow of a fluid under high pressure, said valve means having a plurality of inlet and outlet ports and valve head means for controlling fluid flow, being capable of movement from a first, open, position to a second, closed, position; valve stem means, connected to the valve head means, for effecting movement of the valve head between the first and second positions; and electric motor means for bi-directionally actuating the valve stem means; the improvement in which comprises improved control means comprising:
   a. operator input means for entering a signal to initiate valve movement in a selected direction;
   b. motor controller means for supplying current to the electric motor means, having an output adapted to driving the motor means, such that said motor means activates the valve stem means in a selected direction, and control input means for initiating the supply of current to the motor means and for selecting the direction of travel of the valve stem means;
   c. adjustable current sensing means for measuring the current drawn by the electric motor means, having an input controlled by the output of the motor controller means, and an output adapted to signalling the presence of a current in excess of a limit;
   d. said current limit of the current sensing means being set at a value less than the maximum stalled current of the motor means;
   e. adjustable time delay means activated by the output of the controller means, having output means for indicating the passage of a preselected period of time from activation;
   f. logic means for connecting the operator input means to the control input means of the motor controller means, whereby the motor controller means drives the motor means in the selected direction when the operator input means is signalling for valve movement and the current sensing means is not signalling the presence of a current in excess of the limit;
   g. said current sensing means being constrained to issue the said signal only when the time delay means has signalled the passage of the time delay period, whereby the initial surge of current on activation of the motor means is ignored;
   h. said logic means having latching means for preventing further activation of the motor means in the last-selected direction following receipt of the signal from the current sensing means, whereby the valve is prevented from damage by an attempt to initiate further movement of the valve head means once the first or second position has been reached.

4. The improved motorized valve of claim 3 in which the logic means further comprises override means for resetting the latching means, re-initiating the time delay means, and causing the motor means to be re-activated in the last-selected direction.

* * * * *